United States Patent
Chen

(10) Patent No.: US 11,252,457 B2
(45) Date of Patent: Feb. 15, 2022

(54) MULTIMEDIA STREAMING AND ROUTING APPARATUS AND OPERATION METHOD OF THE SAME

(71) Applicant: Realtek Semiconductor Corporation, Hsinchu (TW)

(72) Inventor: Chun-Yi Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/423,476

(22) Filed: May 28, 2019

(65) Prior Publication Data
US 2020/0021862 A1  Jan. 16, 2020

(30) Foreign Application Priority Data
Jul. 12, 2018 (TW) .................................. 107124146

(51) Int. Cl.
  *H04N 21/443*  (2011.01)
  *H04N 21/2387*  (2011.01)
  *H04N 21/6377*  (2011.01)
  *H04L 29/06*  (2006.01)

(52) U.S. Cl.
  CPC ..... *H04N 21/2387* (2013.01); *H04N 21/4437* (2013.01); *H04N 21/6377* (2013.01); *H04L 65/4084* (2013.01)

(58) Field of Classification Search
  CPC ................................................ H04N 21/4437
  See application file for complete search history.

(56) References Cited

U.S. PATENT DOCUMENTS

| | | | | |
|---|---|---|---|---|
| 9,021,459 B1* | 4/2015 | Qu | ....................... | G06F 9/45558 717/170 |
| 10,355,989 B1* | 7/2019 | Panchai | ................ | H04L 45/586 |
| 2005/0144646 A1* | 6/2005 | Lecrom | ................ | G11B 27/329 725/100 |

(Continued)

FOREIGN PATENT DOCUMENTS

| | | |
|---|---|---|
| CN | 102938718 A | 2/2013 |
| TW | 201234268 A | 8/2012 |
| TW | 201408002 A | 2/2014 |

*Primary Examiner* — Brian T Pendleton
*Assistant Examiner* — Frank Johnson
(74) *Attorney, Agent, or Firm* — Locke Lord LLP; Tim Tingkang Xia, Esq.

(57) ABSTRACT

A multimedia streaming and network apparatus that includes a network module, a storage module and a multi-core processing module is provided. The multi-core processing module performs network communication through the network module and executes the hypervisor from the storage module to perform a multimedia streaming and network apparatus operation method that includes the steps outlined below. A virtual system is established. A router virtual machine is established in the virtual system to execute a router operating system configured to perform a network routing function. A multimedia streaming virtual machine is established in the virtual system to execute a multimedia streaming operating system configured to perform a multimedia playback function. The router virtual machine receives a multimedia network stream and transmits the multimedia stream through a bridge of the virtual system to be playback by the multimedia virtual machine.

8 Claims, 3 Drawing Sheets

(56) References Cited

U.S. PATENT DOCUMENTS

| | | | |
|---|---|---|---|
| 2008/0163239 A1* | 7/2008 | Sugumar | G06F 9/5088 |
| | | | 718/105 |
| 2010/0053435 A1* | 3/2010 | Goziker | H04N 21/8166 |
| | | | 348/558 |
| 2010/0088697 A1* | 4/2010 | Clardy | H04L 12/2834 |
| | | | 718/1 |
| 2010/0153617 A1* | 6/2010 | Miroshnichenko | G06F 3/0635 |
| | | | 711/6 |
| 2010/0199351 A1* | 8/2010 | Protas | G06F 9/45558 |
| | | | 726/25 |
| 2012/0203877 A1* | 8/2012 | Bartholomay | H04L 41/0813 |
| | | | 709/221 |
| 2013/0086202 A1* | 4/2013 | Connelly | G06F 9/45558 |
| | | | 709/217 |
| 2013/0133061 A1* | 5/2013 | Fainkichen | G06F 9/45558 |
| | | | 726/15 |
| 2013/0283270 A1* | 10/2013 | Holland | G06F 9/45533 |
| | | | 718/1 |
| 2014/0115646 A1* | 4/2014 | Rajgopal | H04N 21/4622 |
| | | | 725/110 |
| 2014/0269254 A1* | 9/2014 | Choorakkot Edakkunni | H04L 45/563 |
| | | | 370/218 |
| 2015/0172760 A1* | 6/2015 | AbiEzzi | H04N 21/4781 |
| | | | 725/39 |

* cited by examiner

MULTIMEDIA STREAMING AND ROUTING APPARATUS AND OPERATION METHOD OF THE SAME

RELATED APPLICATIONS

This application claims priority to Taiwan Application Serial Number 107124146, filed Jul. 12, 2018, which is herein incorporated by reference.

BACKGROUND

Field of Invention

The present invention relates to a multimedia streaming and routing technology. More particularly, the present invention relates to a multimedia streaming and routing apparatus and an operation method of the same.

Description of Related Art

The number of providers of the multimedia streaming service gradually increases along with the development of the network to provide a different way to supply multimedia video. The multimedia streaming data is transmitted through network. As a result, the user has to have both the router device and the multimedia streaming device such that the network is accessed by using the router device and the multimedia stream received from the network is processed by the multimedia streaming device. However, for the user, not only the cost is more when the user has to buy both the router device and the multimedia streaming device, but also a larger space is required to dispose the router device and the multimedia streaming device.

Accordingly, what is needed is a multimedia streaming and routing apparatus and an operation method of the same to address the issues mentioned above.

SUMMARY

The invention provides a multimedia streaming and routing apparatus that includes a network module, a storage module and a multi-core processing module. The storage module is configured to store a hypervisor. The multi-core processing module is electrically coupled to the network module and the storage module and is configured to perform network communication through the network module and retrieve the hypervisor from the storage module such that the multi-core processing module performs a multimedia streaming and routing method when the multi-core processing module executes the hypervisor. The multimedia streaming and routing method includes the steps outlined below. A virtual system is established. A router virtual machine is established in the virtual system to operate a router operating system configured to perform a network routing function. A multimedia streaming virtual machine is established in the virtual system to operate a multimedia streaming operating system configured to perform a multimedia streaming function. A multimedia stream is received by the router virtual machine and the multimedia stream is transmitted through a bridge of the virtual system to the multimedia streaming virtual machine to be playback.

Another aspect of the present invention is to provide a multimedia streaming and routing apparatus operating method used in a multimedia streaming and routing apparatus that includes a network module, a storage module configured to store a hypervisor and a multi-core processing module electrically coupled to the network module and the storage module, wherein the multi-core processing module is configured to perform network communication through the network module and retrieve the hypervisor from the storage module such that the multi-core processing module performs the multimedia streaming and routing method when the multi-core processing module executes the hypervisor. The multimedia streaming and routing method includes the steps outlined below. A virtual system is established. A router virtual machine is established in the virtual system to operate a router operating system configured to perform a network routing function. A multimedia streaming virtual machine is established in the virtual system to operate a multimedia streaming operating system configured to perform a multimedia streaming function. A multimedia stream is received by the router virtual machine and the multimedia stream is transmitted through a bridge of the virtual system to the multimedia streaming virtual machine to be playback.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figure 1:
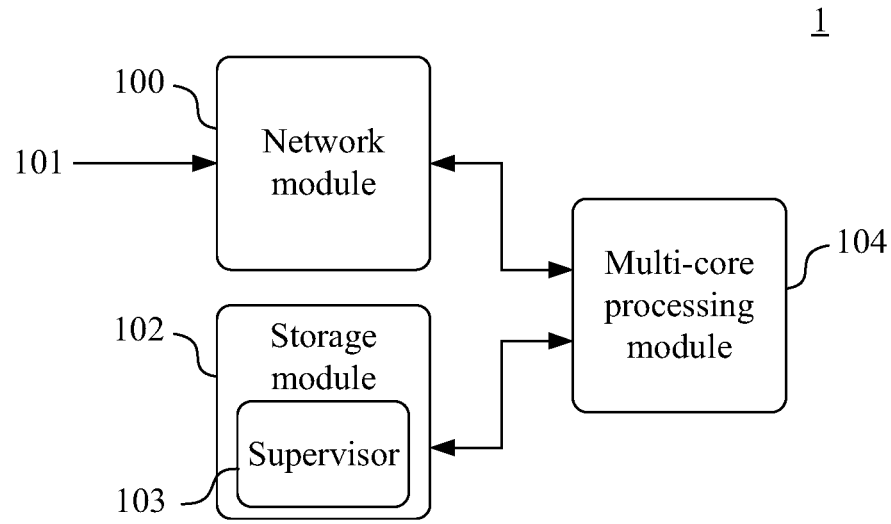
FIG. 1 is a block diagram of a multimedia streaming and routing apparatus in an embodiment of the present invention.

Reference is now made to FIG. 1. FIG. 1 is a block diagram of a multimedia streaming and routing apparatus 1 in an embodiment of the present invention. The multimedia streaming and routing apparatus 1 includes a network module 100, a storage module 102 and a multi-core processing module 104.

The network module 100 can be any module that performs network communication in a wireless or a wired form. In an embodiment, the network module 100 can also be a compound module that can perform network communication in both the wireless and the wired form simultaneously.

In different embodiments, the storage module 102 can be such as, but not limited to a random access memory (RAM) storage module, a read only memory (ROM) storage module, a flash storage module, a floppy disk, a hard disk, a flash drive, a magnetic tape, a database that can be accessed through network or other storage modules that perform identical function understood by those skilled in the art. The storage module 102 is configured to store a hypervisor 103. In other embodiments, the storage module 102 can also be configured to store other application programs, machine executable commands, data or a combination thereof.

The multi-core processing module 104 is a processing module having a multiple of cores and is formed on a single chip. In an embodiment, the multi-core processing module 104 includes such as, but not limited to four cores. The multi-core processing module 104 is electrically coupled to the network module 100 and the storage module 102. As a result, the multi-core processing module 104 can access the network through the network module 100 to perform network communication with the remote server to access such as, but not limited to the multimedia stream 101. Further, the multi-core processing module 104 can access the storage module 102 to store processed data in the storage module 102, retrieve and process the data in the storage module 102 and retrieve and execute the application program in the storage module 102.

In an embodiment, the multi-core processing module 104 is configured to retrieve the hypervisor 103 from the storage module 102 to perform the function of the multimedia streaming and routing apparatus 1.

More specifically, in an embodiment, the hypervisor 103 can be implemented as such as, but not limited to an operating system and can establish a virtual system environment when being executed by the multi-core processing module 104 to further establish and manage virtual machines in the virtual system. The hypervisor 103 can assign the physical hardware resource of the multimedia streaming and routing apparatus 1, such as but not limited to the operation amount of the multi-core processing module 104 and the storage amount of the storage module 102, to the virtual machines.

Figure 2:
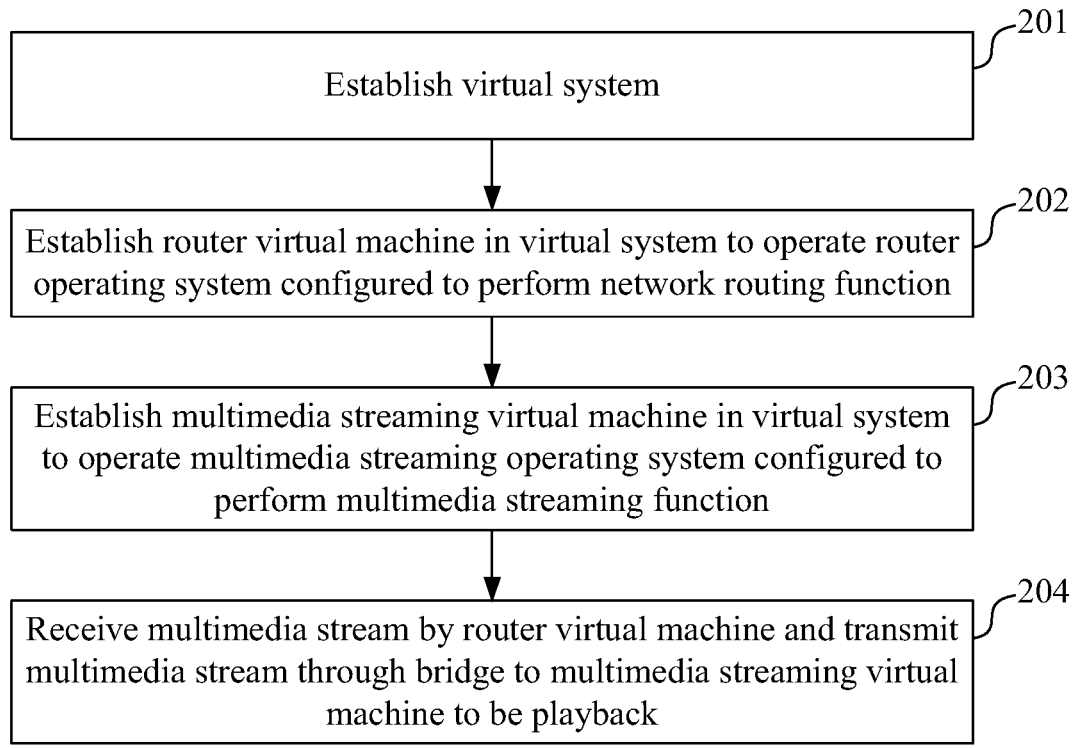
FIG. 2 is a flow chart of a multimedia streaming and routing apparatus operating method in an embodiment of the present invention.
Figure 3:
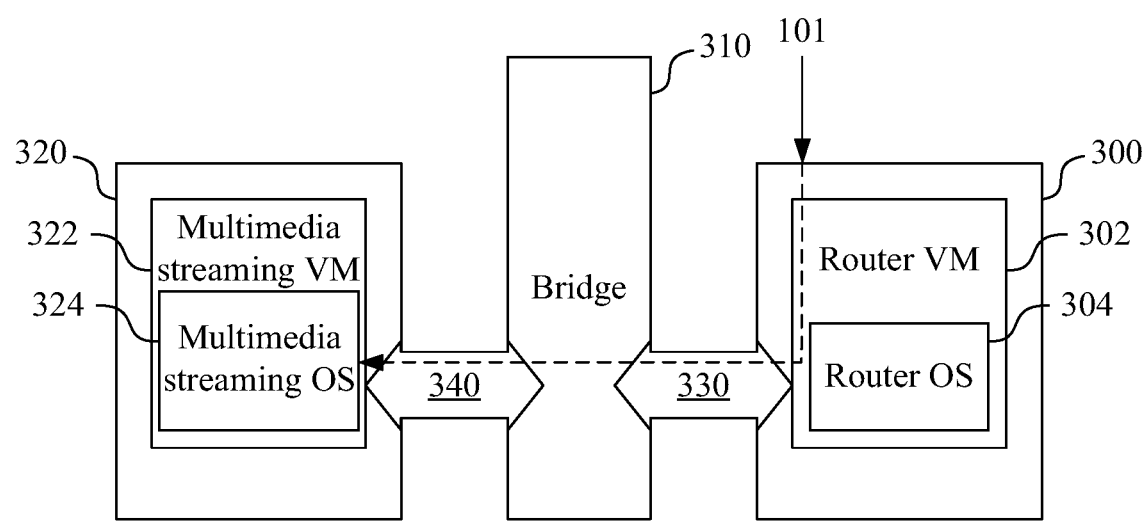
FIG. 3 is a block diagram of a virtual system implemented by the multimedia streaming and routing apparatus in an embodiment of the present invention.

Reference is now made to FIG. 2 and FIG. 3. The function of the multimedia streaming and routing apparatus 1 is described in detail in the following paragraphs in accompany with FIG. 2 and FIG. 3.

FIG. 2 is a flow chart of a multimedia streaming and routing apparatus operating method 200 in an embodiment of the present invention. The multimedia streaming and routing apparatus operation method 200 can be used in the multimedia streaming and routing apparatus 1 illustrated in FIG. 1.

FIG. 3 is a block diagram of a virtual system 3 implemented by the multimedia streaming and routing apparatus 1 in an embodiment of the present invention. When the hypervisor 103 is executed by the multi-core processing module 104, the hypervisor 103 operates as the virtual system 3 to perform the multimedia streaming and routing apparatus operating method 200.

The multimedia streaming and routing apparatus operating method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the virtual system 3 is established. As described above, in an embodiment, the multi-core processing module 104 can retrieve the hypervisor 103 from the storage module 102 to establish the virtual system 3. In an embodiment, the virtual system 3 is implemented by such as, but not limited to a Xen architecture.

In an embodiment, when the virtual system 3 is initialized, the virtual system 3 can establish such as, but not limited to a system control area 300 and a bridge 310 can establish such as, but not limited to a user area 320 according to the requirements in subsequent operation.

In an embodiment, the system control area 300 is Domain 0. The virtual system 3 can establish the virtual machine in the system control area 300 to realize the control and management of the other areas in the virtual system 3. The user area 320 is Domain U. The virtual system 3 can establish other virtual machines in the user domain 320 such that the virtual machines are controlled and managed by the system control area 300. In different embodiments, the number of the user area 320 can be one or more, depending on the requirements.

The bridge 310 is a communication interface between the areas in the virtual system 3. The system control area 300 can be connected to the bridge 310 through such as, but not limited to a rear driver 330. The user area 320 can be connected to the bridge 310 through such as, but not limited to a front driver 340. As a result, the system control area 300 can transmit the command or information to the user area 320 through a path including the rear driver 330, the bridge 310 and the front driver 340. The user area 320 can transmit the command or information to the system control area 300 through a path that is the reverse of the path described above.

In step 202, a router virtual machine 302 (abbreviated as router VM in FIG. 3) is established in the virtual system 3 to operate a router operating system 304 (abbreviated as router OS in FIG. 3) configured to perform a network routing function.

In an embodiment, the router virtual machine 302 is established in the system control area 300. As a result, the router virtual machine 302 can communicate with the bridge 310 through the rear driver 330.

In an embodiment, the router operating system 304 is an OpenWrt operating system. The router operating system 304 is configured to support such as, but not limited to the applications of wide area network (WAN), local area network (LAN), WiFi 5G/2.4G and Bluetooth.

In step 203, a multimedia streaming virtual machine 322 (abbreviated as multimedia streaming VM in FIG. 3) is established in the virtual system 3 to operate a multimedia streaming operating system 324 (abbreviated as multimedia streaming OS in FIG. 3) configured to perform a multimedia streaming function.

In an embodiment, the multimedia streaming virtual machine 322 is established in the user area 320 of the virtual system 3. As a result, the multimedia streaming virtual machine 322 can communicate with the bridge 310 through the front driver 340.

In an embodiment, the multimedia streaming virtual machine 322 is a set-up box (STB) playback virtual machine or a over the top (OTT) playback virtual machine.

In an embodiment, the multimedia streaming operating system 324 is an Android operating system. The multimedia streaming operating system 324 is configured to support such as, but not limited to the multimedia stream of the network stream.

In an embodiment, when the virtual system 3 establishes the router virtual machine 302 and the multimedia streaming virtual machine 322, the physical resources of the storage module 102 and the multi-core processing module 104 in the multimedia streaming and routing apparatus 1 are assigned to the router virtual machine 302 and the multimedia streaming virtual machine 322 depending on the requirements of the resource in a virtual way.

In an embodiment, the resource required by the multimedia streaming virtual machine 322 is more than the resource required by the router virtual machine 302. As a result, when the virtual system 3 assigns the resource of the virtual core processors, the number of the virtual cores assigned to the multimedia streaming virtual machine 322 is larger than the number of the virtual cores assigned to the router virtual machine 302.

For example, the multi-core processing module 104 of the multimedia streaming and routing apparatus 1 may include such as, but not limited to the physical resource of four cores. The virtual system 3 may assign such as, but not limited to two virtual cores to the router virtual machine 302 and four cores to the multimedia streaming virtual machine 322 that requires more resources.

In step 204, a multimedia stream 101 is received by the router virtual machine 302 and the multimedia stream 101 is transmitted through the bridge 310 to the multimedia streaming virtual machine 322 to be playback.

In an embodiment, based on the assigned resource, the router virtual machine 302 receives the multimedia stream 101 from the physical network module 100 in FIG. 1. Further, the router virtual machine 302 transmits the multimedia stream 101 to the multimedia streaming virtual machine 322 through the rear driver 330, the bridge 310 and the front driver 340. The multimedia stream 101 is then processed and playback by the multimedia streaming virtual machine 322.

As a result, the multimedia streaming and routing apparatus 1 of the present invention can execute the hypervisor 103 by using the multi-core processing module 104 to establish the virtual system 3 and further establish the router virtual machine 302 and the multimedia streaming virtual machine 322 in the virtual system 3. The physical resources can be elastically assigned in a virtual way to perform the network routing function and the multimedia stream playback function.

Furthermore, since the router virtual machine 302 and the multimedia streaming virtual machine 322 can operate independently, when the multimedia streaming virtual machine 322 is required to rebooted due to the update process, the operation of the router virtual machine 302 is not affected.

Figure 4:
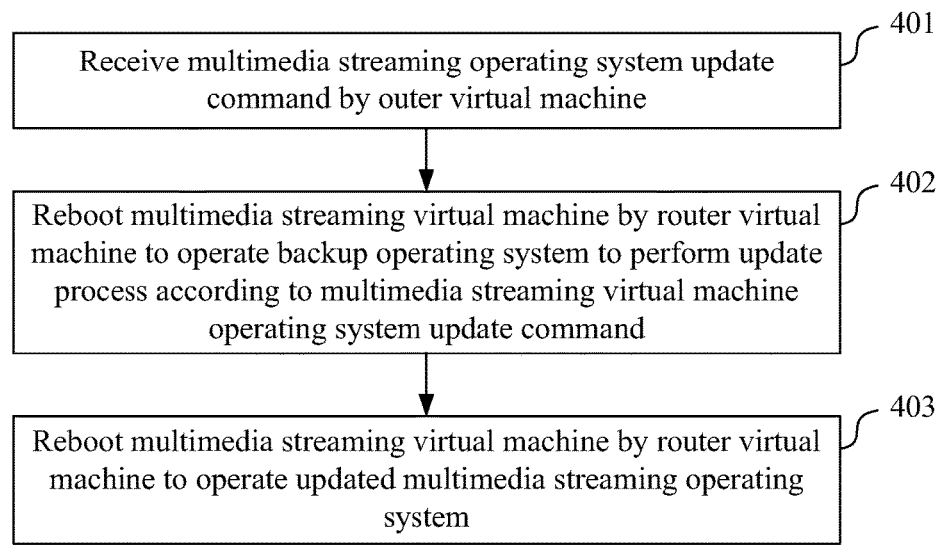
FIG. 4 is a flow chart of a multimedia streaming and routing apparatus operating method in an embodiment of the present invention.
Figure 5:
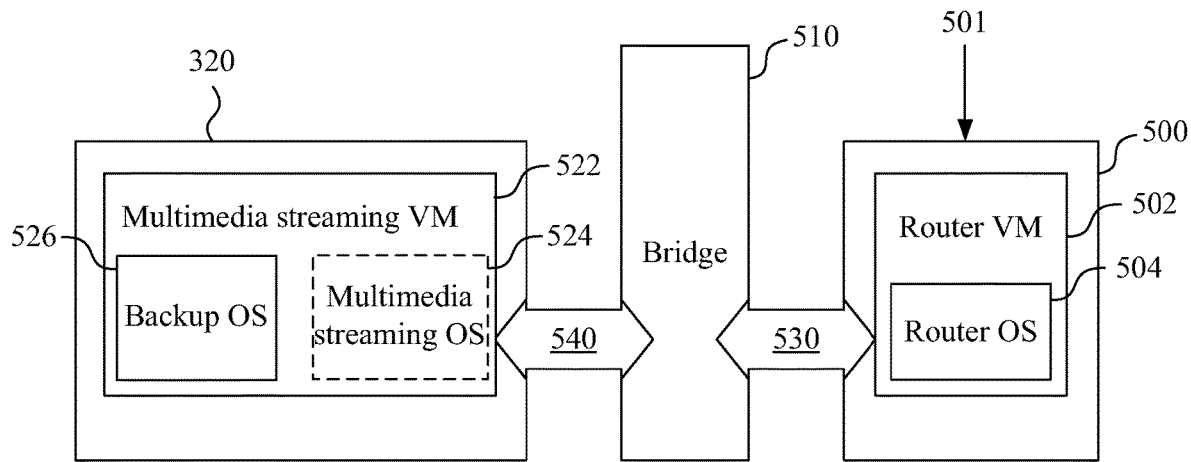
FIG. 5 is a block diagram of a virtual system in an embodiment of the present invention.

Reference is now made to FIG. 4 and FIG. 5. FIG. 4 is a flow chart of a multimedia streaming and routing apparatus operating method 400 in an embodiment of the present invention. The multimedia streaming and routing apparatus operation method 400 can be used in the multimedia streaming and routing apparatus 1 illustrated in FIG. 1.

FIG. 5 is a block diagram of a virtual system 5 in an embodiment of the present invention. When the hypervisor 103 is executed by the multi-core processing module 104, the hypervisor 103 operates as the virtual system 5 to perform the multimedia streaming and routing apparatus operating method 400.

In the present embodiment, the virtual system 5 is identical to the virtual system 3 and includes the system control area 500, a bridge 510 and a user area 520. The system control area 500 and the user area 520 can communicate by using the rear driver 530, the bridge 510 and the front driver 540. A router virtual machine 502 (abbreviated as router VM in FIG. 5) is established in the system control area 500. A multimedia streaming virtual machine 522 (abbreviated as multimedia streaming VM in FIG. 5) is established in the user area 520. The virtual machine 502 operates a router operating system 504 (abbreviated as router OS in FIG. 5) to perform network routing function. The multimedia streaming virtual machine 522 operates a multimedia streaming operating system 524 (abbreviated as multimedia streaming OS in FIG. 5) to perform multimedia stream playback function.

The multimedia streaming and routing apparatus operating method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, a multimedia streaming operating system update command 501 is received by the router virtual machine 502.

In an embodiment, based on the assigned resource, the router virtual machine 502 receives the multimedia streaming operating system update command 501 from the physical network module 100 in the multimedia streaming and routing apparatus 1 in FIG. 1. In an embodiment, based on the assigned resource, the router virtual machine 502 can also receive the multimedia streaming operating system update command 501 from an input module (not illustrated) further included in the multimedia streaming and routing apparatus 1 illustrated in FIG. 1.

In step 402, the multimedia streaming virtual machine 522 is rebooted by the router virtual machine 502 to operate a rescue operating system 526 (abbreviated as rescue OS in FIG. 5) to perform update process according to the multimedia streaming virtual machine operating system update command 501.

In an embodiment, the rescue operating system 526 receives the over the air (OTA) data, such as but not limited to an image file, from the physical network module 100 in the multimedia streaming and routing apparatus 1 in FIG. 1 through the router virtual machine 502 to perform update process. In the present embodiment, FIG. 5 illustrates the status that step 402 is finished. The multimedia streaming operating system 524 is illustrated by dashed lines and the back up operating system 526 is illustrated by solid lines to represent the status that the rebooted multimedia streaming virtual machine 522 does not operate the multimedia streaming operating system 524 temporarily so as to operate the back up operating system 526.

In step 403, the multimedia streaming virtual machine 522 is rebooted by the router virtual machine 502 to operate the updated multimedia streaming operating system 524.

As a result, when the multimedia streaming virtual machine 522 is rebooted due to the update process of the operating system operated thereby, the router virtual machine 502 can still operate. When the user accesses the network by using the multimedia streaming and routing apparatus 1, the operation is not affected by the update process of the multimedia streaming operating system 524 since the multimedia streaming operating system 524 still operates normally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multimedia streaming and routing apparatus comprising:
   a network communicator;
   a storer configured to store a hypervisor; and
   a multi-core processor electrically coupled to the network communicator and the storer and configured to perform network communication through the network communicator and retrieve the hypervisor from the storer such that the multi-core processor performs a multimedia streaming and routing method when the multi-core processor executes the hypervisor, wherein the multimedia streaming and routing method comprises:
      establishing a virtual system, wherein when the virtual system is initialized, the virtual system establishes a system control area, a bridge, and a user area;
      establishing a router virtual machine in the system control area of the virtual system to operate a router operating system configured to perform a network routing function, wherein the router virtual machine communicates with the bridge through a rear driver;
      establishing a multimedia streaming virtual machine in the user area of the virtual system to operate a multimedia streaming operating system configured to perform a multimedia streaming function, wherein the multimedia streaming virtual machine communicates with the bridge through a front driver; and
      receiving a multimedia stream by the router virtual machine and transmitting the multimedia stream through a bridge of the virtual system to the multimedia streaming virtual machine to be playback;
   wherein the multimedia streaming and routing method further comprises:
      receiving a multimedia streaming operating system update command;
      rebooting the multimedia streaming virtual machine by the router virtual machine to operate a rescue operating system different from the multimedia streaming operating system to perform update process according to the multimedia streaming virtual machine operating system update command, wherein the router virtual machine perform the network routing function to access network when the the multimedia streaming virtual machine perform update process; and
      rebooting the multimedia streaming virtual machine by the router virtual machine to operate the updated multimedia streaming operating system.

2. The multimedia streaming and routing apparatus of claim 1, wherein the router operating system is an OpenWrt operating system and the multimedia streaming operation system is an Android operating system.

3. The multimedia streaming and routing apparatus of claim 1, wherein the multimedia streaming and routing method further comprises:
   assigning a first number and a second number of virtual cores to the router virtual machine and the multimedia streaming virtual machine respectively by the hypervisor, wherein the second number is larger than the first number.

4. The multimedia streaming and routing apparatus of claim 1, wherein the multimedia streaming virtual machine is a set-up box (STB) playback virtual machine or a over the top (OTT) playback virtual machine.

5. A multimedia streaming and routing apparatus operating method used in a multimedia streaming and routing apparatus that comprises a network communicator, a storer configured to store a hypervisor and a multi-core processor electrically coupled to the network communicator and the storer, wherein the multi-core processor is configured to perform network communication through the network communicator and retrieve the hypervisor from the storer such that the multi-core processor performs the multimedia streaming and routing method when the multi-core processor executes the hypervisor, wherein the multimedia streaming and routing method comprises:
   establishing a virtual system, wherein when the virtual system is initialized, the virtual system establishes a system control area, a bridge, and a user area;
   establishing a router virtual machine in the system control area of the virtual system to operate a router operating system configured to perform a network routing function, wherein the router virtual machine communicates with the bridge through a rear driver; and
   establishing a multimedia streaming virtual machine in the user area of the virtual system to operate a multimedia streaming operating system configured to perform a multimedia streaming function, wherein the multimedia streaming virtual machine communicates with the bridge through a front driver; and receiving a multimedia stream by the router virtual machine and transmitting the multimedia stream through a bridge of the virtual system to the multimedia streaming virtual machine to be playback,
   wherein the multimedia streaming and routing method further comprises:
   receiving a multimedia streaming operating system update command;
   rebooting the multimedia streaming virtual machine by the router virtual machine to operate a rescue operating system different from the multimedia streaming operating system to perform update process according to the multimedia streaming virtual machine operating system update command; and
   rebooting the multimedia streaming virtual machine by the router virtual machine to operate the updated multimedia streaming operating system.

6. The multimedia streaming and routing apparatus operating method of claim 5, wherein the router operating system is an OpenWrt operating system and the multimedia streaming operation system is an Android operating system.

7. The multimedia streaming and routing apparatus operating method of claim 5, wherein the multimedia streaming and routing method further comprises:
   assigning a first number and a second number of virtual cores to the router virtual machine and the multimedia streaming virtual machine respectively by the hypervisor, wherein the second number is larger than the first number.

8. The multimedia streaming and routing apparatus operating method of claim 5, wherein the multimedia streaming virtual machine is a set-up box (STB) playback virtual machine or a over the top (OTT) playback virtual machine.

* * * * *